United States Patent [19]

Bailey et al.

[11] Patent Number: 4,472,277
[45] Date of Patent: Sep. 18, 1984

[54] GREASE TRAP

[76] Inventors: Christopher Bailey, 1004 Greenwood; Ernest T. Lago, 707 Fernwood, both of Jackson, Mich. 49203

[21] Appl. No.: 407,155

[22] Filed: Aug. 11, 1982

[51] Int. Cl.³ .............................................. B01D 25/00
[52] U.S. Cl. .................................. 210/238; 137/574; 137/590; 210/515
[58] Field of Search ............... 137/574, 581, 590, 356, 137/362; 210/515, 518, 519, 801, 238; 220/1 C

[56] References Cited

U.S. PATENT DOCUMENTS

| | | | |
|---|---|---|---|
| 723,618 | 3/1903 | Newton | 210/538 |
| 1,634,871 | 7/1927 | Hepler | 210/538 |
| 2,550,497 | 4/1951 | Ribeiro | 137/581 |
| 2,682,356 | 6/1954 | Allen | 137/590 |
| 2,763,335 | 9/1956 | Janssen | 182/9 |
| 2,822,927 | 2/1958 | Burdette | 210/320 |
| 3,168,905 | 2/1965 | Wiltshire | 137/590 |
| 4,319,762 | 3/1982 | Streit et al. | 220/1 C |
| 4,381,996 | 5/1983 | Kugler et al. | 210/519 |

*Primary Examiner*—Martin P. Schwadron
*Assistant Examiner*—Sheri Novack
*Attorney, Agent, or Firm*—Beaman & Beaman

[57] ABSTRACT

The invention pertains to water and grease separators as used in a conventional plumbing system. A synthetic plastic receptacle is supported upon a framework usually located below, or adjacent to, a sink receiving liquid wastes to be separated. The framework supports a pair of coupling halves connected to the plumbing system, and inlet and outlet fittings mounted upon the receptacle align with and are connected to the frame supported couplings when the receptacle is mounted upon the frame. Baffling within the receptacle aids in the separation of water and grease, the fittings permit the receptacle to be quickly removed from the plumbing circuit, and a valved drain within the receptacle permits rapid disposal of its contents.

6 Claims, 6 Drawing Figures

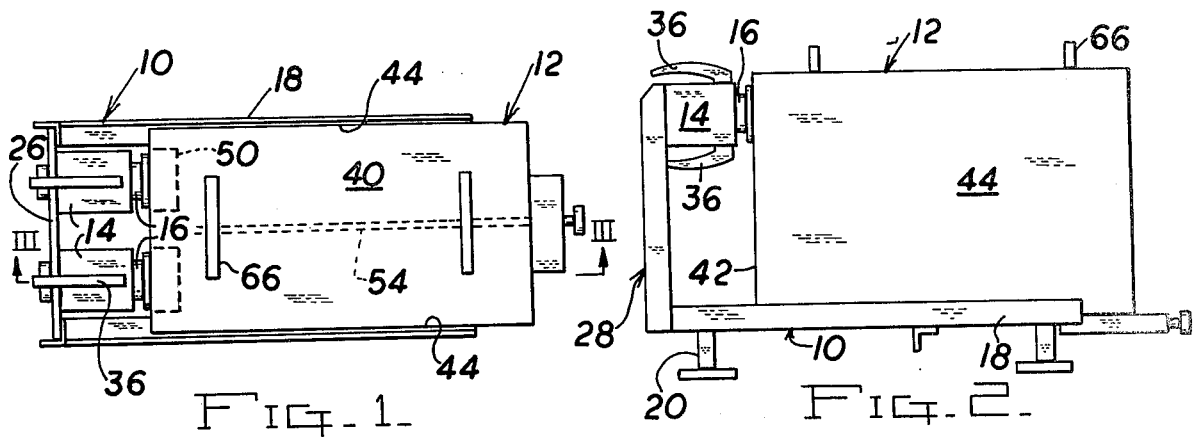
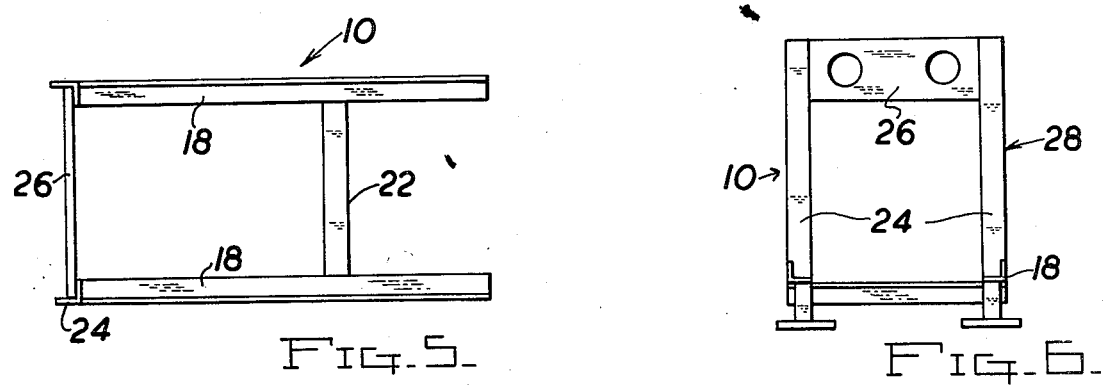
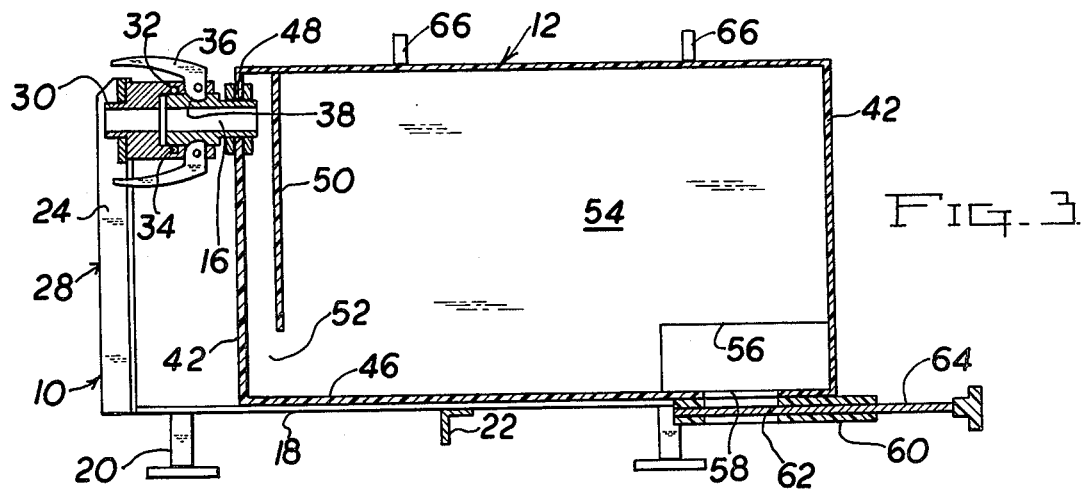
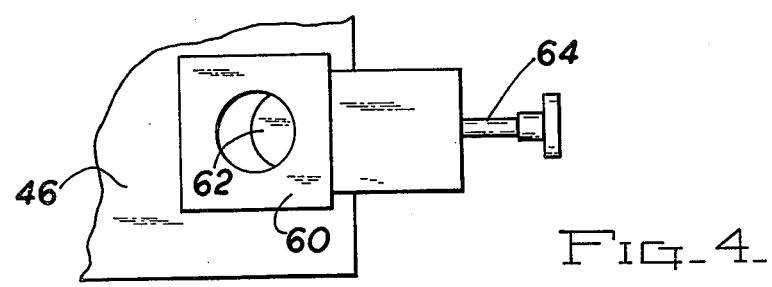

GREASE TRAP

BACKGROUND OF THE INVENTION

Grease traps are commonly incorporated into liquid waste systems servicing sinks and the like wherein water, fats and grease are intermixed. As the grease will accumulate within the waste water conduits clogging and stoppage of the conduits will occur in a relatively short duration, and in order to prevent such occurrence grease traps, settling reservoirs, or other receptacles are often incorporated within the waste water plumbing system to separate the fatty liquids and solids from the water. Such separators are normally located on the floor, or in some cases, within the floor pit or recess and are not readily accessible even though regular cleaning is required to remove the accumulated grease.

In the past, grease traps normally constitute a permanent part of the waste water plumbing circuit, utilize bolt-down covers, require substantial construction and installation expense, and limit the location of sinks and drains handling water and grease mixtures.

Because of the difficulty in maintaining conventional types of grease traps maintenance is often ignored, or not attended to at required intervals, resulting in grease entering the plumbing system and creating problems.

It is an object of the invention to provide a relatively inexpensive sealed chamber grease trap capable of efficiently separating grease from waste water wherein the trap may be economically manufactured and installed.

A further object of the invention is to provide an efficient grease trap for liquid waste systems wherein a grease trap may be readily connected to, or removed from the liquid waste system, and is portable wherein the grease may be readily disposed of with a minimum of handling.

An additional object of the invention is to provide a portable grease trap for liquid waste water systems wherein the trap receptacle is attached to, or disconnected from, the plumbing system by quickly actuated fluid couplings.

Yet another object of the invention is to provide a grease trap which may be readily installed within existing waste water systems, is of concise configuration for installation beneath sinks and the like, provides an interchangeable inlet and outlet, and is resistant to corrosion.

Yet a further object of the invention is to provide a grease trap for liquid waste systems wherein the trap receptacle is portable and utilizes a valved drain to release the contents.

In the practice of the invention a metal framework is utilized to support the liquid waste receptacle, and the framework includes a horizontally disposed base upon which receptacle is supported, and a vertically extending pedestal to which a pair of coupling halves are mounted. The coupling halves are connected to the liquid waste water plumbing system, and in a conventional installation the support frame will be fixed in location to provide support of the permanent plumbing and the length of the frame legs can be adjusted to accommodate the height of the associated drain.

A closed synthetic plastic receptacle is removably supportable upon the horizontal portion of the frame. The receptacle includes inlet and outlet fittings releasably connectable to the frame coupling halves and aligned therewith upon placing the receptacle upon the frame. Quick release latching apparatus utilized with frame and receptacle fittings permit the receptacle to be incorporated into the plumbing system wherein all waste liquids flowing through the system flows into the receptacle.

The receptacle is provided with baffles adjacent the inlet and outlet, and grease or other foreign matter within the waste liquid which is lighter than water will float upon the liquid within the receptacle and be retained therein by the baffle system. Thus, liquid flowing from the receptacle through the outlet fitting will be free of grease and other lighter substances.

Preferably, the receptacle is formed of a transparent or translucent synthetic plastic material, and the level of waste water and grease therein may be readily observed. When the receptacle has retained a significant amount of grease as to require emptying the quick release latches on the couplings are actuated permitting the receptacle to be released from the frame coupling halves, and by the use of handles affixed to the receptacle the receptacle is transported to a waste container. Discharge of the receptacle contents is through a valved drain opening formed in the bottom of the receptacle, and once emptied, the receptacle and frame coupling halves interconnected, and the trap is again in position for normal service.

The apparatus of the invention is of a relatively simple nature to manufacture, install and maintain, and the aforementioned apparatus provides a versatility of installation and ease of maintenance not heretofore achieved in waste liquid grease traps.

BRIEF DESCRIPTION OF THE DRAWINGS

The aforementioned objects and advantages of the invention will be appreciated from the following description and accompanying drawings wherein:

FIG. 1 is a top plan view of a grease trap assembly in accord with the invention, FIG. 2 is a side elevational view of the invention, FIG. 3 is an elevational, sectional view of the grease trap as taken along Section III—III of FIG. 1, FIG. 4 is an enlarged, detail, bottom view of the drain valve, the valve being shown in the partially open position, FIG. 5 is a top plan view of the frame, per se, and FIG. 6 is an end elevational view of the frame as taken from the left of FIG. 5.

DESCRIPTION OF THE PREFERRED EMBODIMENT

A grease trap in accord with the invention basically consists of a supportive frame 10 upon wihch the receptacle 12 is mounted. The frame includes coupling halves 14 connected to the fluid waste plumbing system to be treated, and the receptacle includes fitting halves 16 which are readily connectable to and removable from the frame coupling parts.

The frame 10 may be formed of angle iron, and includes a pair of spaced, parallel, horizontally disposed base elements 18 from which depend legs 20. The spacing between the elements 18 is maintained by spacer bar 22 welded thereto.

A pair of columns 24 vertically extend from an end of the base elements 18, and the columns are interconnected at their upper ends by the plate 26. The plate 26 and the columns 24 constitute a pedestal 28 for mounting the couplings 14.

The plate 26 is provided with a pair of openings and each opening receives a female coupling half 14. The coupling halves 14 are associated with adapters or extensions 30 projecting through the associated plate hole, and the extensions are threaded for connection to the standard drain or waste fittings and conduits conventionally utilized in liquid waste water plumbing systems.

The coupling halves 14 include a cylindrical inner recess 32, and a sealing ring 34 and pivoting latch levers 36 are mounted at the upper and lower regions of the halves, and include cam surfaces 38 adapted to project into the recess 32 for a purpose later described.

The receptacle 12, as illustrated, is of a rectangular form having a top wall 40, end walls 42, lateral side walls 44, and a bottom 46. The horizontal width of the receptacle between the side walls 44 is such that the receptacle fits between the frame base elements 18 resting upon the lower angle of the elements, and the receptacle is horizontally movable upon the elements 18 in a direction parallel thereto.

The receptacle left end wall 42, FIG. 3, is provided with a pair of holes 48, one of which is shown in FIG. 3, in axial alignment with the couplings 14 within the frame plate 26. The holes 48 receive male coupling fittings 16, one of which comprises an inlet fitting while the other constitutes the outlet fitting. The fittings 16 are generally cylindrical and of a diameter as to be received within the recesses 32 of the coupling halves 14. The fittings 16 each include an annular groove defined in the circumference thereof which aligns with the cams 38 of the levers 36, and as shown in FIG. 3, and the seal 34 will sealingly engage with circular surfaces of the fittings 16 when the coupling parts are fully mated.

A baffle system is preferably incorporated into the interior of the receptacle 12 in order to augment the entrapment of grease therein. In the disclosed embodiment this baffle system includes a U-shaped synthetic plastic channel 50, FIGS. 1 and 3, adjacent each of the fittings 16, the free ends of the legs of each channel being bonded to the adjacent receptacle end wall 42. As appreciated from FIG. 3, the vertical height of the channels is less than that of the receptacle wherein a passage 52 exists between the lower edge of the channels and the bottom 46. Thus, liquid entering the receptacle through the inlet fitting flows downwardly under the associated baffle channel, while liquid leaving the receptacle through the outlet fitting is supplied from the region adjacent the bottom 46.

A partition 54 extends the length of the panel between end walls 42, and is sealed to the end walls and the top wall 40. The partition includes an opening at 56, whereby the two chambers defined within the receptacle by the partition are in communication adjacent the bottom 46.

A drain opening 58 is defined in the receptacle bottom 46 adjacent an end wall 42 and centrally between the lateral sides 44. A gate valve 60 is affixed to the underside of the receptacle having an opening selectively closed by the linear movable gate 62 manually operated by the actuator handle 64. In FIG. 4 the gate is illustrated in a partially open condition.

In use, the receptacle 12 is placed upon the frame base elements 18 and moved toward the pedestal 28. As support of the receptacle 12 upon the frame 10 aligns the axes of the couplings 14 and fittings 16 the fittings are received within the couplings and the grooves thereof align with the latch levers 36 such that the cams 38 will enter the fitting grooves and maintain the fitting therein. The O-rings 34 produce a fluid tight seal between coupling halves. Also, the valve gate 62 is moved to the left, FIG. 3, to close the drain opening 58.

The grease trap is now in an operative condition, and as the receptacle 12 constitutes a portion of the liquid waste plumbing system waste water will flow from the sink or other waste water supply, through the couplings and fittings into the receptacle chamber aligned therewith. As the receptacle fills the water level raises within the channel communicating with the outlet fitting, and upon the level reaching that of the outlet fitting liquid flow enters the plumbing conduit affixed thereto.

The grease and other fatty substances within the waste liquid flowing into the receptacle 12 will collect at the upper level of the liquid in that its density is lighter than water. Thus, due to the location of the openings 56 adjacent the bottom 46 with respect to the outlet fitting, the water flowing from the outlet fittings is taken from the lower region of the receptacle, and is free of grease and fat.

As the amount of grease floating upon the water surface increases such accumulation can be observed through the transparent or translucent sides of the receptacle 12, and prior to the grease reaching the level of the outlet passage 52 the receptacle must be emptied.

To empty the receptacle the lever latches 36 of both couplings 14 are pivoted to release the cam portion therreof from the fitting groove. Thereupon, the receptacle 12 may be moved in a direction away from the pedestal 28 upon the base elements 18 to withdraw the fittings 16 from the couplings 14. By grasping the handles 66 mounted on top wall 40 the receptacle may then be carried to a waste container and opening of the gate valve 60 by the actuator handle 64 will permit the receptacle to be rapidly drained.

Thereupon, the gate valve 60 is closed, the receptacle 12 is again placed upon the frame base elements 18, and moved in a direction to engage the coupling halves 14 and fittings 16, and the levers 36 are again pivoted to the locking condition shown in FIG. 3 and the waste system is again operational.

As the receptacle 12 is formed of a synthetic plastic material it is of such weight, and capacity, to be readily handled and lifted by one person. Also, as a grease trap in accord with the invention can be readily placed below a sink, the trap may be installed into existing plumbing systems without requiring significant modification to the system or adjacent structure.

It is appreciated that various modifications to the inventive concepts may be apparent to those skilled in the art without departing from the spirit and scope of the invention.

1. A grease trap utilized within a permanent plumbing system characterized by its portability and ease of maintenance comprising, in combination, a closed waste water receptacle having an inlet and an outlet adapted to confine water and grease, a support removably supporting said receptacle, carrying handles defined on said receptacle, first and second conduit connections mounted upon said support adapted to be connected to the permanent plumbing system, a quick connect and disconnect inlet fitting mounted within said receptacle inlet, a quick connect and disconnect outlet fitting mounted within said receptacle outlet, said inlet fitting being releasably connectable to said first conduit connection and said outlet fitting being releasably connectable to said second conduit connection upon said receptacle being placed upon said support, and drain means defined upon said receptacle.

2. In a grease trap as in claim 1, said container being formed of a synthetic plastic material.

3. In a grease trap as in claim 1, said conduit connections each comprising a female coupling half, said fittings each comprising a male coupling half sealingly receivable within a female coupling half, and latch means mounted upon each female coupling half releasably maintaining the interconnection of coupling halves.

4. In a grease trap as in claim 1, said support comprising a metal frame including a horizontal base, said receptacle being mounted upon said base, a vertically extending pedestal defined upon said support extending above said base, said conduit connections being mounted upon said pedestal.

5. In a grease trap as in claim 1, baffle means within said receptacle adjacent said inlet and outlet baffling liquid flow through said inlet and outlet.

6. In a grease trap as in claim 1, said drain means comprising an opening defined within said receptacle and a valve within said opening movable between open and closed positions.

* * * * *